United States Patent
Moravsky et al.

[15] 3,671,708
[45] June 20, 1972

[54] APPARATUS FOR ELECTRIC CONTACT SPOT WELDING, PREFERABLY OF SMALL-SIZE PARTS

[72] Inventors: Vladislav Eduardovich Moravsky, Bulvar Lesi Ukrainki, 2, kv. 50; David Solomonovich Vorona, ulitsa Scherbakova, 51, kv. 21, both of Kiev; Boris Pavlovich Shinkarenko, ulitsa Sovetskaya, I, Fastov Kievskoi Oblasti, all of U.S.S.R.

[22] Filed: Oct. 7, 1969

[21] Appl. No.: 864,972

[52] U.S. Cl. ............................................. 219/78, 219/86
[51] Int. Cl. ............................................................ B23k 9/00
[58] Field of Search ................................................ 219/78, 86

[56] References Cited

UNITED STATES PATENTS

| | | |
|---|---|---|
| 2,727,122 | 12/1955 | Gartner ........................... 219/86 |
| 2,750,484 | 6/1956 | Ewald .............................. 219/86 |
| 2,958,757 | 11/1960 | Stolz et al. ...................... 219/86 |
| 3,117,216 | 1/1964 | Stewart ............................ 219/86 |

*Primary Examiner*—R. F. Staubly
*Assistant Examiner*—Hugh D. Jaeger
*Attorney*—Waters, Roditi, Schwartz & Nissen

[57] ABSTRACT

The present invention relates to apparatus for electric contact welding, preferably, of small-size parts, wherein a movable rod supporting the top electrode holder is connected through at least one leaf spring to a mechanism adapted to develop a contact welding pressure. The end of this leaf spring is rigidly secured to the mechanism adapted to develop the contact welding pressure and the other end of this leaf spring freely bears upon the rod supporting the top electrode holder. The high-current electric conduit which supplies the welding current to the top electrode holder has a portion, adjacent to the top electrode holder, which extends perpendicularly to the housing of the bottom electrode holder.

2 Claims, 3 Drawing Figures

APPARATUS FOR ELECTRIC CONTACT SPOT WELDING, PREFERABLY OF SMALL-SIZE PARTS

The present invention relates to electric welding machinery, and, more specifically, it relates to apparatus for electric contact spot welding, preferably, of small-size parts employed in electronic devices, precision instruments, communication installations, and so forth.

Known in the art are apparatus for electric contact spot welding, particularly, of small-size parts, comprising a top electrode holder and a bottom electrode holder, disposed in the housing of the apparatus and connected to a source of the welding current through respective electric current conduits, e.g. bus wires. The top electrode holder is operatively connected through a plurality of leaf springs with a mechanism adapted to develop a welding contact pressure (see, for example, "Electrical Equipment for Precision Spot Welding" by N.M.Sokolov, Privolzhskoye Publishing House, 1964).

Welding of small-size parts by this known apparatus is accompanied by splashes of the molten metal out of the weld area, which molten metal is apt to solidify, e.g. on the constituent parts of an electronic or electric vacuum device, thereby producing noise during operation of an electronic or radio circuit employing such device. Moreover, it might lead to reduced reliability of the performance of such circuits and to their premature deterioration.

In this known apparatus, the movable rod of the top electrode holder is rigidly connected with leaf springs transmitting the welding pressure thereto, whereby during the welding operation, when the parts being welded are compressed between the electrodes, the alignment of the two electrodes can be affected, and the working surfaces of their adjacent ends may become non-parallel. Consequently, a situation might occur in which the electric current and the welding pressure become non-uniformly distributed over the contact area of the parts being welded, which both affects the quality of welding and leads to splashing molten metal beyond the weld area.

There are other types of known apparatus for electric contact spot welding of parts (see, for example, U.S. Pat. No.3,140,381, cl.218–86 and British Pat. No. 988,187, cl.B3A ), wherein the electrode holder is operatively connected with a mechanism adapted to develop a contact welding pressure through a pivot means and a system of levers. However, this causes the mass of the movable parts of the apparatus to be increased, which results in poorer dynamic characteristics of the apparatus and, consequently, poorer quality of welding.

Additionally, in the known apparatus of the last-mentioned type, the electric current conduit in the area thereof, adjacent to the top electrode holder, extends substantially parallel to the current-carrying housing of the bottom electrode holder. As a result, with the electric welding current flowing through the above mentioned parts, electrodynamic forces are generated which tend to move the electrodes away from each other, thus reducing the welding pressure, affecting the welding operation and promoting conditions in which the molten metal might be splashed out of the weld area.

There is still another known type of apparatus for electric contact spot welding of small-size parts (see, for example, the specifications of the spot welding machine, Model SEC-60, marketed by the "Minitubes" Company ), wherein the top electrode holder is driven in operation through a mechanism comprising springs and pivoted levers. In apparatus of this type, in order to insure axial alignment of the working ends of the electrodes and parallelism of their contact surfaces, the inclination angle of the top electrode relative to a horizontal plane is adjustable. However, although at the moment when a desired welding contact pressure is developed, the working ends of the electrodes in this known apparatus are axially aligned, and their contact surfaces are parallel to each other, in the course of the welding operation such alignment and parallelism might become affected, due to variations of the geometrical size of the parts being handled and also to melting and crystallization of the metal in the weld area.

There is another known type of electric contact spot welding apparatus (see the specifications of the machine, Model RChA, marketed by the "Origin Electric Co.," Japan) in which the bottom electrode holder is movable and spring-biased in operation. However, in this known apparatus, the compression spring which is adapted to bias the bottom electrode holder and upon which this holder bears in operation is already completely compressed at the moment the welding current is supplied to the electrodes. Consequently, with this structure, the bottom electrode is able to "follow up" any shrinking of the metal in the weld area, but is unable to "follow up" the expansion of the metal.

It is an object of the present invention to provide an apparatus for electric contact spot welding, particularly, of small-size parts, wherein the operative connection between the top electrode holder and the mechanism adapted to develop a contact welding pressure provides axial alignment of the working ends of the two electrodes and parallelism of the contact surfaces thereof during the stage of compressing the parts to be welded and also throughout the rest of the welding operation.

It is another object of the present invention to provide an apparatus for electric contact spot welding, wherein no unwanted electrodynamic forces affecting the contact welding pressure are developed.

It is another object of the present invention to provide an apparatus, wherein both electrodes are able to "follow up" the process of melting and crystallization of the metal in the weld area.

With these and other objects in view, an apparatus for electric contact spot welding, preferably, of small-size parts, comprises, in accordance with the invention a top electrode holder and a bottom electrode holder received in the housing of the apparatus and connected through respective electric current conduits to a source of the welding current supply, and a movable rod supporting this top electrode holder and operatively connected through at least one leaf spring with a mechanism adapted to develop a welding pressure. In accordance with the present invention, the leaf spring has one extremity thereof rigidly secured to the mechanism adapted to develop a welding pressure and the other extremity thereof adapted to engage freely this movable rod supporting the top electrode holder; the electric current conduit, which is adapted to supply a welding current to the top electrode holder, having a part thereof disposed adjacent the top electrode holder, extending normally with respect to the bottom electrode holder.

Owing to the above mentioned structural features, the apparatus for electric contact spot welding, embodying the present invention, combines comparatively low inertia of the movable parts with provisions for positive axial alignment of the working ends of the two electrodes and for parallelism of the contact surfaces thereof because, in this apparatus, operating pressure is transmitted from the leaf springs to the movable electrode holder without any rigid connection therebetween. Moreover, in the apparatus embodying the present invention, the action of electrodynamic forces in the course of the welding operation is practically eliminated since, in this apparatus, the electric current supply circuit does not coincide with the mechanical driving means, and the electric current conduit which supplies the welding current to the top electrode holder extends perpendicularly to the current-carrying housing of the bottom electrode holder.

It is advantageous in the apparatus embodying the present invention, for the bottom electrode holder to be mounted for vertical reciprocation in the housing of the apparatus and to be adapted to engage freely one extremity of at least one additional leaf spring, the other extremity of this additional leaf spring being rigidly secured to a stationary part of the housing of the apparatus. This structural feature provides for establishing a faster closing motion of the electrodes during a welding operation, and it additionally enables the bottom electrode to follow up both shrinking and expansion of the metal in the weld area. It also provides for selecting various accelerations of the closing motion of the electrodes in the weld area independently of the value of a desired welding contact pressure.

The above-said features promote a higher quality of welding and minimize the possibility of the molten metal being splashed out of the weld area.

The present invention will be better understood from the following detailed description of an embodiment thereof, with due reference being made to the accompanying drawings, wherein.

Figure 1:
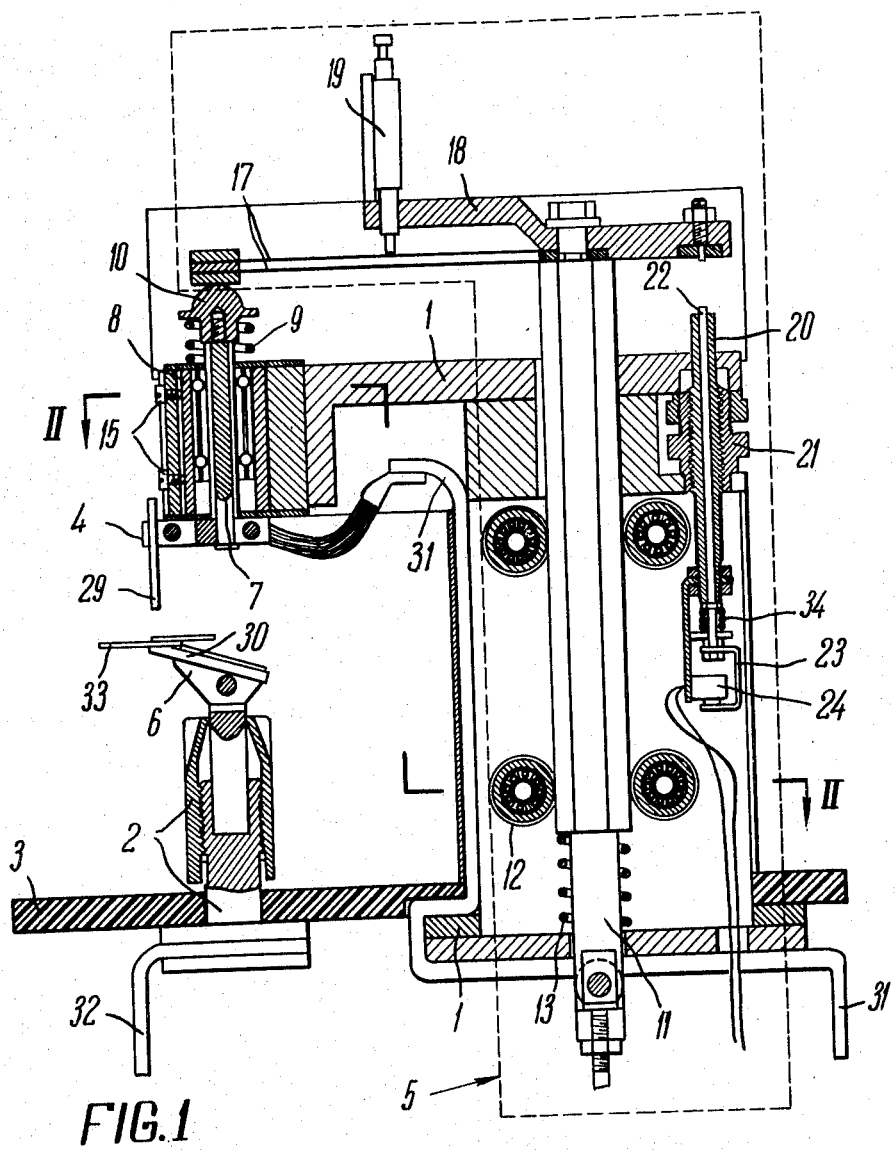
FIG. 1 is a longitudinal sectional view of an apparatus for electric contact spot welding in accordance with the invention.

Referring now to the drawings, an apparatus for electric contact spot welding, preferably, of small-size parts, comprises a housing composed of portions 1 and 2 (FIG. 1) supported on a base 3 made of an electrically insulating material.

Disposed in the housing portion/are a top electrode holder assembly 4 and a mechanism 5 for developing welding pressure, whereas a bottom electrode holder assembly 6 is disposed in the housing portion 2.

The top electrode holder 4 is mounted on a rod 7 which is vertically reciprocable in guides 8 of either a ball or a roller type.

Surrounding the upper end portion of the rod 7 is a coiled compression spring 9, one end of the spring 9 bearing against a stationary surface of the housing portion 1 and the other end thereof permanently biasing the rod 7 upwardly through a semi-spherical head 10 mounted on the upper end of the rod.

The mechanism 5 comprises a plurality of levers which are operatively connected with either a foot-actuated drive or a power drive (not shown) and a vertically reciprocable bar 11 movably mounted in roller guides 12 supported by the housing portion 1.

Surrounding the lower portion of the vertically reciprocable bar 11 is another coiled compression spring 13, one end of the spring 13 bearing against a radial shoulder of the bar 11 and the other end of the spring bearing against the stationary base 3.

Figure 2:
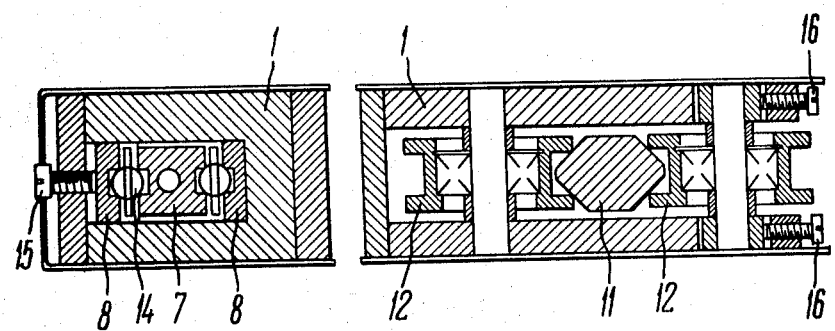
FIG. 2 is a cross-sectional view taken along line II — II of FIG. 1.

The guides 8, e.g. with spherical rollers 14 (FIG. 2) are so arranged in the housing portion 1 that one of them can be slidably adjusted against the rod 7 and retained in an adjusted position by screws 15. The adjustment is intended to prevent any oscillations, displacement or axial rotation of the rod 7 in the course of its vertical reciprocations.

Screws 16 are provided for adjustably pressing the roller guides 12 against a lateral side of the bar 11, in order to eliminate play therebetween and thereby to prevent positively any displacement, rotation or oscillations of the bar 11 in the guides 12.

The upper end portion of the bar 11 (FIG. 1) has rigidly secured thereto one extremity of a stack of leaf springs 17 adapted to transmit a welding pressure. The other extremity of the stacked leaf springs 17 freely bearing upon the head 10 of the rod 7. The end portion of the bar 11 securing the springs carries a bracket 18 supporting a welding pressure indicator 19.

The welding pressure is defined by the degree of the elastic deformation of the leaf springs 17 during the downward, working stroke of the reciprocable bar 11, and can be adjusted by means of a set screw 20 which can be displaced in a vertical direction in relation to the bracket 18 by means of an adjustment nut 21.

The set screw 20 has an axial bore therethrough slidably receiving a stem 22, the bottom end of the stem 22 carrying a U-shaped piece 23 adapted to operate a microswitch 24 connected in the control circuit of the welding current supply source (not shown) of the herein described welding apparatus, whereas the upper end portion of the stem 22 projects above the adjacent end of the set screw 20.

Figure 3:
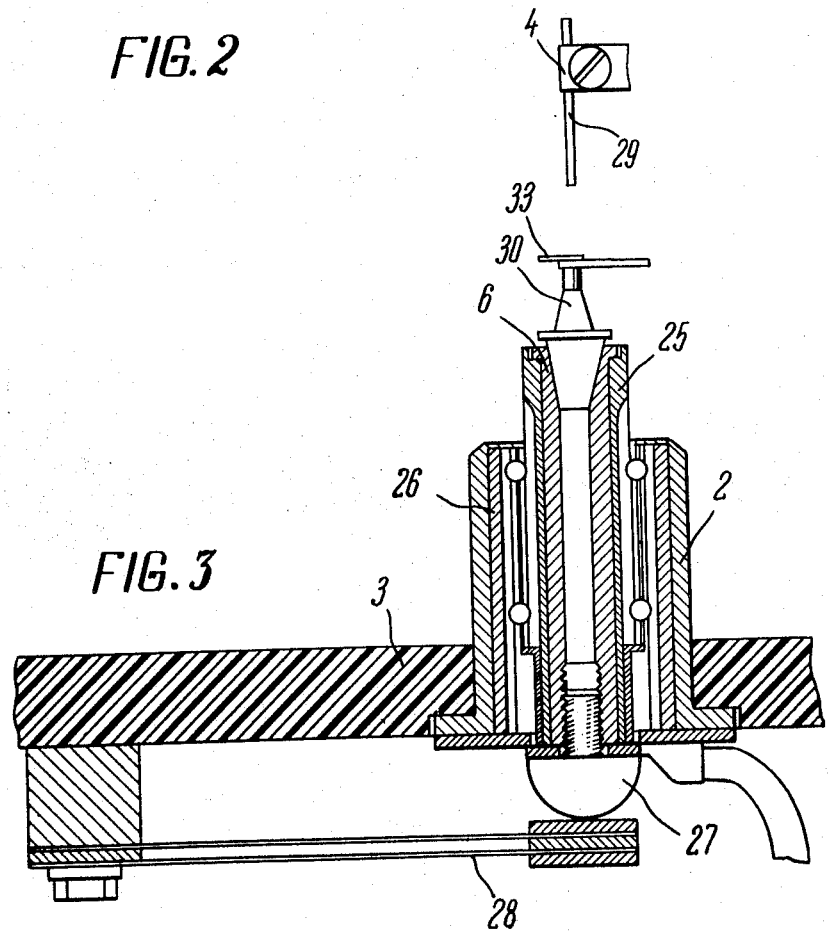
FIG. 3 is a longitudinal sectional view of a modification of the bottom electrode holder assembly in an apparatus for electric contact spot welding in accordance with the invention.

In order to provide accelerated drawing of the welding electrodes, as they are moved toward each other for a welding operation, and also to enable the bottom electrode to "follow" shrinking and expansion of the metal in the weld area, the bottom electrode holder 6 (FIG. 3) may be mounted on a rod 25 which can be vertically reciprocated along guides 26, e.g. of a ball or a roller type. In this modification, the bottom extremity of the rod 25 has attached thereto a semi-spherical head 27 which bears freely upon the free end portion of a stack of cantilever leaf springs 28 whose other end is rigidly secured to the base 3 of the apparatus.

The electrodes 29 and 20 are releasably secured, respectively, in the electrode holders 4 and 6 and the latter can be rotatively adjusted to any desired angular position about the axes of the rods 7 (FIG. 1) and 25 (FIG. 3), respectively. The welding current supply source (not shown) is connected with the electrode holder 4 (FIG. 1) through a high-current conduit 31 and with the electrode holder 6 through a high-current conduit 32, the flexible portion of the conduit 31 extending substantially perpendicularly to the portion 2 of the housing of the apparatus.

The herein described welding apparatus operates, as follows.

Electrodes 29 and 30 of a type suitable for the job to be performed are mounted and secured in the respective holders 4 and 6. The adjustment nut 21 is operated to adjust the set screw 20 in a vertical direction, i.e. to set a desired welding pressure. Desired electric ratings of the welding operation are pre-set on the control panel of the welding current source (not shown).

Then the drive means (not shown) of the reciprocating bar 11 is actuated to drive the bar 11 downwardly in the guides 12, until the bracket 18 abuts against the end face of the screw 20.

At that time, the stack of leaf springs 17 (of which one end is rigidly secured to the upper end of the bar 11) bears at the free end portion upon the head 10 of the bar 7, thus driving the latter downwardly in its guides 9, until the electrode 29 abuts against the article 33 to be welded. This article is supported on the bottom electrode 30. As the rod 7 is driven downwardly, the spring 9 is compressed, and the leaf springs 17 are deformed by a value defined by the spacing between the bracket 18 and screw 20 at the beginning of the downward stroke of the bar 11.

The degree of the elastic deformation of the leaf springs 17, which, as has been already mentioned corresponds to the desired welding pressure, is pre-set by means of the adjustment nut 21, and the pressure can be read on the welding pressure indicator 19.

As the bracket 18 encounters the upper end face of the set screw 20 at the end of the downward stroke of the bar 11, the stem 22 is driven downwardly in the bore of the screw 20, and the U-shaped piece 23 releases the operating button of the microswitch 24, whereby the welding current supply source (not shown) is energized for commencing the welding operation on the article 33. Since the high-current conduit 31 in the region adjacent the electrode holder 4 extends normal to the current-carrying housing of the bottom electrode holder 6, any action of the electrodynamic forces upon the welding pressure in the zone of welding is prevented.

In the modification, where the bottom electrode holder 6 is mounted on the rod 25 (FIG. 3) which is vertically reciprocable in the guides 26, the welding pressure acting upon the article 33 makes the rod 23 move downwardly along the guides 26 and deform the leaf springs 28.

In the last-mentioned case, the electrode 30 is able to adjust itself upwardly and downwardly in operation, to follow up the variations in the volume of the metal being heated in the welding zone.

By adjusting the degree of the rigidity of the stack of leaf springs 28 (e.g. by varying either the cross-sectional area of the springs or the amount of the springs in the stack), it is possible to control the acceleration of drawing together of the electrodes in the zone of the weld, independently of the static welding pressure.

When the welding operation is completed, the foot- or power-actuated drive (not shown) of the bar 11 is disengaged, and the action of the compression spring 13 raises the bar 11 (FIG. 1) together with the leaf springs 17, the bracket 18 and the welding pressure indicator 19 into their respective initial positions. Simultaneously, the compression spring 34 acts upon the now released stem 22, making the latter move upwardly in the axial bore of the screw 20, whereby the U-piece 23 depresses the button operating the microswitch 24, and the welding current supply source (not shown) is deenergized. The compression spring 9 in the meantime raises the rod 7 into the initial position thereof.

The springs 28 relax (FIG. 3) and raise the rod 25 together with the bottom electrode holder 6 into their initial position.

The herein described welding apparatus is now prepared for commencing the next welding operation.

It should be noted that the herein disclosed welding apparatus prevents squeezing or splashing of the molten metal beyond the boundaries of the weld.

An apparatus embodying the present invention can be used to greatest advantage in machines for electric contact microwelding, particularly, in machines for capacitor welding.

What is claimed is:

1. An apparatus for electric contact spot welding, particularly of small-size parts, comprising a housing; a top electrode holder located in said housing; a bottom electrode holder disposed in said housing coaxially with said top electrode holder; ball-type guides in said housing; a movable rod mounted in said ball-type guides and supporting said top electrode holder; a mechanism adapted to develop a welding pressure; indicating means registering said pressure; leaf springs having one end rigidly attached to said mechanism and another end which freely bears against the head of said top electrode holder; spring means by which the top electrode holder is spring-biased against said housing, and electric current conduits adapted to connect said top electrode holder and said bottom electrode holder to a source of welding current, one of said current conduits, which is adapted to supply said top electrode holder, extending perpendicular to the housing with the conduit of the bottom electrode holder at a point adjacent to said top electrode holder.

2. An apparatus as claimed in claim 1, comprising further ball-type guides, said bottom electrode holder being mounted for vertical displacement in said further ball-type guides and having a head freely supported on one end of the leaf springs, the other end of said leaf springs being rigidly secured to said housing of the apparatus.

* * * * *